July 31, 1956    R. C. GAZLEY    2,756,952
OMNI-DIRECTIONAL SHOCK AND VIBRATION ISOLATING DEVICE
Filed June 21, 1952    2 Sheets-Sheet 1

INVENTOR.
RICHARD C. GAZLEY
BY
ATTORNEY

July 31, 1956 R. C. GAZLEY 2,756,952
OMNI-DIRECTIONAL SHOCK AND VIBRATION ISOLATING DEVICE
Filed June 21, 1952 2 Sheets-Sheet 2

INVENTOR.
RICHARD C. GAZLEY
BY
ATTORNEY

United States Patent Office 2,756,952
Patented July 31, 1956

2,756,952

OMNI-DIRECTIONAL SHOCK AND VIBRATION ISOLATING DEVICE

Richard C. Gazley, Shaker Heights, Ohio, assignor to The Cleveland Pneumatic Tool Company, Cleveland, Ohio, a corporation of Ohio Application June 21, 1952, Serial No. 294,875

5 Claims. (Cl. 248—13)

This invention relates broadly to shock isolators, but more particularly to a device capable of isolating low amplitude vibrations causing noise, as well as high amplitude shock vibrations in any direction.

The main object of this invention is to produce a shock and noise isolating device especially designed and constructed for supporting navy equipment installed in submarines wherein shock waves from underwater explosions may be received from any direction. Such equipment may include auxiliary engines, generators or the like, which after experiencing a severe shock from any direction are still serviceable, even though all other equipment may have been put out of commission.

Another object of this invention is to produce a shock isolating device comprising a plurality of conventional shock isolation units, arranged and disposed in a manner enabling shock isolation to be effected independently of the direction of applied shock.

Another object of this invention is to produce such shock isolating device having isolation units arranged geometrically to normally produce identical action or response in all directions.

Another object of this invention resides in the geometrical aggroupment of shock isolating units to form a tripod wherein units of varied physical characteristics are mounted in distinct angular relationship to produce different responses in different directions.

Another object of this invention is to produce such a device with simple and efficient means for isolating low amplitude vibrations causing noise, and with conventional shock absorbing units for isolating high amplitude shock vibrations in any direction.

These objects are accomplished by a construction free of complications, and by an arrangement of parts resulting in a compact unit which is strong, durable and efficient.

Figure 1:
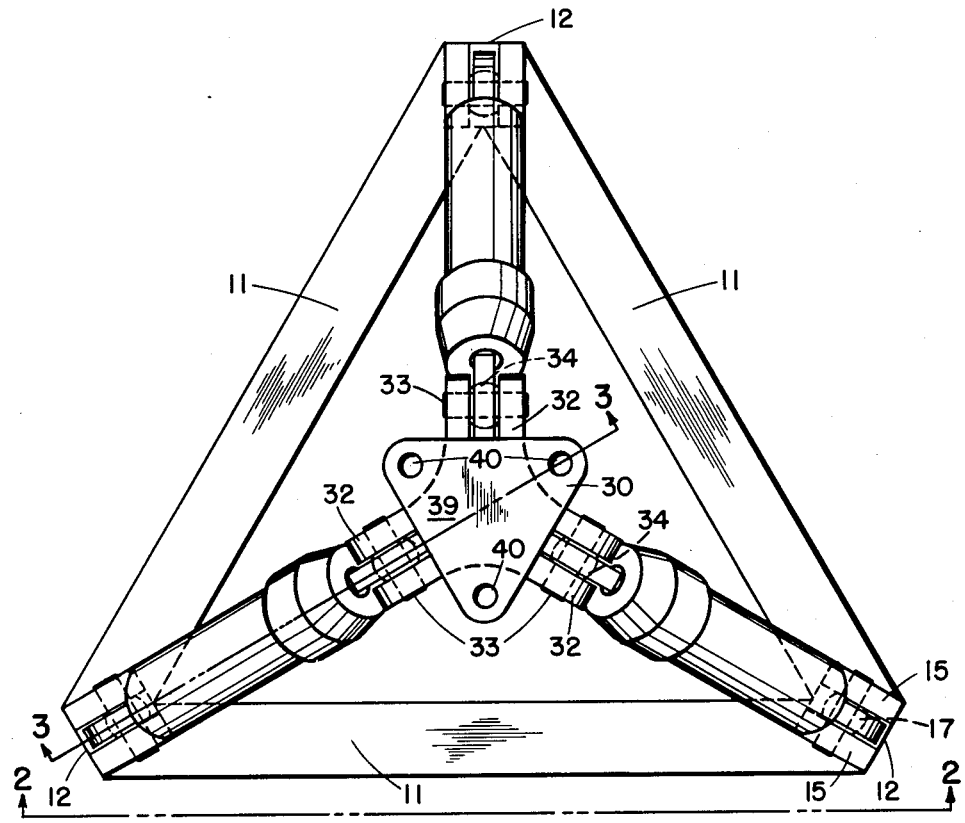
Figure 1 is a top plan view of a device embodying the invention.
Figure 2:
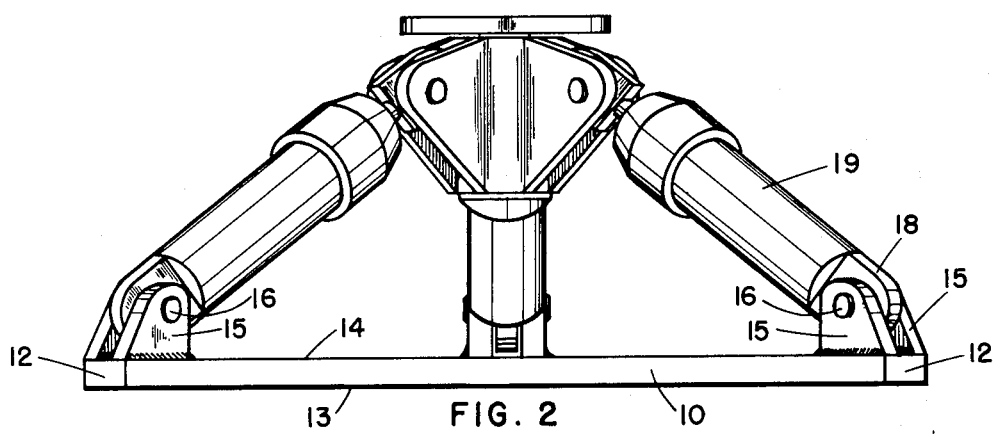
Figure 2 is a side view looking in the direction of the arrows 2—2 in Figure 1.
Figure 3:
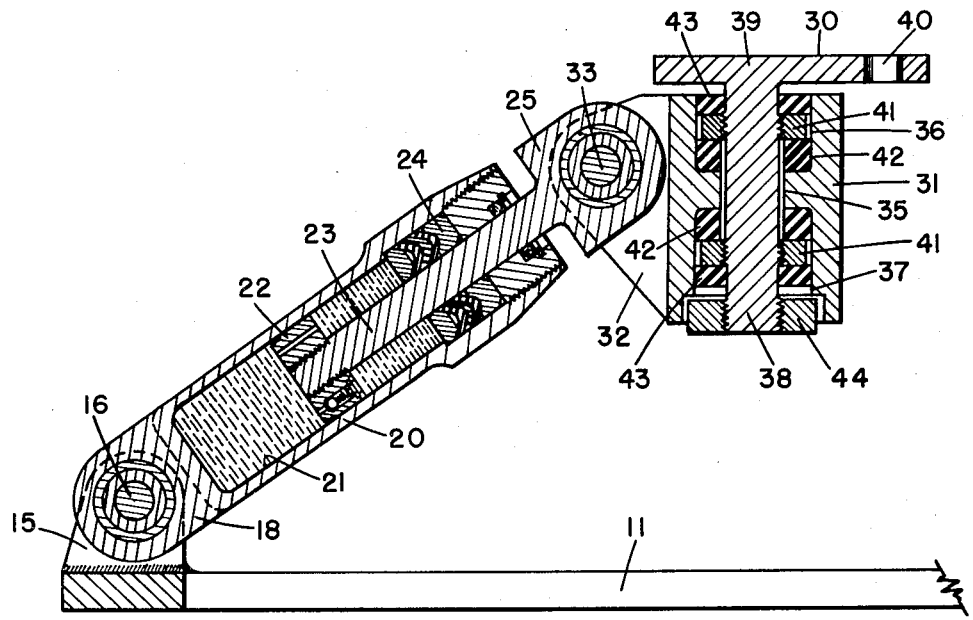
Figure 3 is an enlarged longitudinal sectional view taken on line 3—3 in Figure 1.
Figure 4:
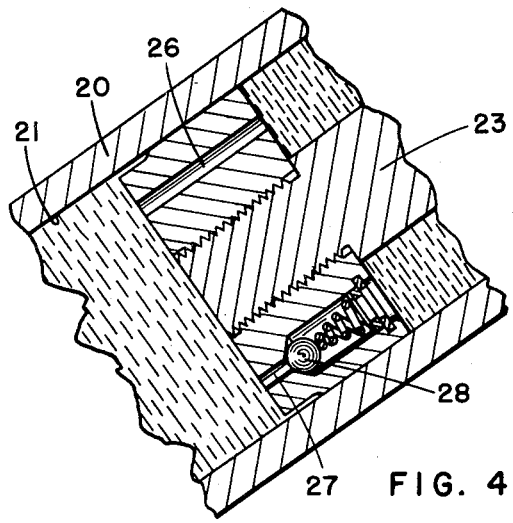
Figure 4 is an enlarged view of a portion of Figure 3.

Referring to the drawings, in which like symbols designate corresponding parts throughout the several views, 10 represents a base preferably made of relatively heavy flat integral metal strips 11 forming an equilateral triangle and having its normally pointed corners trimmed off as at 12. The lower side 13 of the base is adapted to rest on the ground or supporting structure, while the upper side 14 has welded on each corner thereof two upwardly extending laterally spaced lugs 15, transversally apertured to receive a cross pin 16. Between the lugs 15, each cross pin 16 is formed with a partial sphere 17, on which is mounted for limited universal movement relative thereto the flatted lower end or terminal 18 of a shock absorber 19. As clearly shown on the drawings, terminal 18 is located between the lugs 15 and is transversed by an aperture of partial spherical shape adapted to fit on the partial sphere 17 of cross pin 16. In thickness the terminal 18 is somewhat smaller than the distance between the lugs 15, thereby enabling true but limited universal movement of the terminals 18 relative to the base 10.

The shock absorbers or shock isolator units 19 may be of any desired type. Preferably, they are of the telescopic liquid type, each comprising a cylindrical housing 20 formed integral with the terminal 18 and having a cylindrical chamber 21 in which is reciprocably mounted a piston head 22 screwed or otherwise affixed to the inner end of a piston rod 23. The rod extends through a stuffing-box 24 which closes the normally opened upper end of the chamber 21, and has its free or outer end formed with a flat but enlarged head or terminal 25 similar to the lower terminal 18. As is usually the case in shock absorbers of this type, the piston 22 is provided with a free orifice 26 enabling free flow of the liquid from one to the other side of the piston, and with a valve controlled orifice 27 normally closed by a spring pressed ball valve 28.

Supported by the three shock isolating units 19, there is a head assembly generally designated by 30, which includes a substantially cylindrical upright head 31 having three sets of equally spaced lugs 32, each set including two radially extending and laterally spaced lugs similar to the lugs 15. Each set of lugs is also transversally apertured to receive a cross pin 33 formed between the lugs with a partial sphere 34. Like the terminals 18, each terminal 25 is transversed by an aperture of partial spherical shape adapted to fit on the partial sphere 34 of the cross pin 33. In thickness the terminal 25 is somewhat smaller from the distance between adjacent lugs 32, thereby enabling true but limited universal movement of the terminals 25 relative to the head assembly 30.

Head 31 is provided with a bore 35 extending centrally therethrough and having its ends enlarged to form upper and lower counterbores 36, 37 respectively. Extending through the head 31, that is, through its bore 35, there is a central shaft 38 having on its upper end an integral flat pad or saddle 39, which is adapted to carry the work intended to be cushioned. As shown in Figure 1, the saddle is also of equilateral triangular shape and has apertures 40 extending therethrough, preferably near the corners thereof, to receive work securing bolts or the like, not shown. In each counterbore 36 and 37, the shaft 38 is threaded to receive a metal washer 41 fixed thereon and of a diameter smaller than that of the counterbore. Each metal washer is separated or isolated from the bottom of its corresponding counterbore by a rubber ring or snubber 42 which has an inner diameter substantially greater than the diameter of the shaft 38. Also mounted in each of the counterbores 36, 37 on the other side of the metal washer 41, there is another rubber ring 43 fitting closely on the shaft 38, while the extreme lower end of the shaft 38 has screwed thereon a retainer 44. Shaft 38 is of a diameter smaller than that of the bore 35, and since the metal washers 41 are substantially smaller than the counterbores 36, 37, there can be no radial metal to metal contact between the shaft 38 or its saddle 39 and the head 31. The top and bottom rubber rings 43, which fit closely in the housing and on the shaft, isolate the shaft radially from the housing, while the two center rubber rings isolate the shaft vertically from the housing, thereby providing vibration isolation both axially and radially.

From the foregoing description, it will be understood that the novel geometrical arrangement of the three double acting shock absorbers or high amplitude vibration absorbing units 19, form a tripod having 90° angles between units and a slope angle of substantially 35°. This tripod has a fixed base 10 and a head assembly 30 to which units 19 are connected by universal joints constituting self-aligning bearings assuring that only axial load is applied to each unit. The tripod head 30, in addition to accommodating its load or work receiving saddle 39, also forms the noise isolator or low amplitude vibration absorbing part of the device. Low amplitude vibrations causing noise are isolated radially by the rubber rings 43 and axially by the rubber rings 42. When the device is subjected to higher amplitude vibrations or to a shock of sufficient magnitude to cause sufficient compression of the disks 42 and metal to metal contact between either the underside of the saddle 39 or shaft retainer 44 with the head 31, the higher amplitude vibrations or shock thus transmitted to the head 31 are absorbed by the double acting units 19. In such instance, the units are caused to operate in their usual manner for checking inward or outward movement of the piston 22 in the chamber 21, that is, checking compression and extension of the unit, by displacement of liquid, stored in the chamber 21, through the piston orifices 26 and 27. More specifically, when any one of the units 19 is subjected to compressive axial load, the piston head 22 and rod 23 move inwardly within chamber 21, thereby causing the liquid within the chamber to be compressed. In other words, the compression of the unit is resiliently resisted by the liquid within chamber 21, and the unit becomes an effective resilient unit. As the piston 22 moves inwardly, liquid between the piston and the bottom of the chamber 21 flows outwardly through piston free orifice 26 and orifice 27 by opening the valve 28. Upon movement of the piston in the other direction, liquid within the upper end portion of the chamber 21 must return below the piston through the free orifice 26, while orifice 27 is closed by the check valve 28 to increase the damping effect which is required to prevent excessive violent operation in rebound. Since any conventional shock isolation units of the telescoping type can be used and their operation is generally well known in this art, no further description of the operation of the units 19 is thought necessary, other than pointing out that with the present geometrical arrangement of the three identical units, shock and vibration isolation is effected in all directions, including vertically upward, and the three identical unit isolators provide for identical response in all directions. However, different responses in different directions can be obtained by other arrangements of the angles between unit isolators of different detail characteristics. It must be kept in mind that the exact construction shown and described is intended only as a disclosure of a practical form of the invention, it being understood that the geometrical arrangement of the unit isolators in the form of a tripod, together with the physical characteristics of the units may be modified to produce different results.

From the foregoing description it will also be understood that by providing the universal joints or self aligning bearings at both ends of the unit isolators, and mounting the units in a tripod form, impact load in any direction applied on the saddle 39 is automatically translated into only axial load and movement of the units. It will further be understood that details of structure and arrangement of parts shown and described may be variously changed and modified without departing from the spirit and scope of the invention.

I claim:

1. In a device of the character described a substantially flat base, a head spaced from said base, a plurality of vibration absorbing units each including two telescoping members movable relative to each other along their longitudinal axis, a swivel connection between one member of each unit and said base and between the other member of each unit and said head, the projection of said axes of all of said units intersecting and being inclined relative to a line extending perpendicular to said base whereby said head is movable relative to said base, a load member adapted to support a vibrating load, means on said head connected to said load member resiliently maintaining the latter in a normal position relative to said head, and means limiting the maximum movement of said load member relative to said head which maximum movement is substantially less than the maximum movement of said head relative to said base provided for by said units.

2. A device as claimed in claim 1 wherein the projections of all the axes of said units intersect said line perpendicular to said base at the same point.

3. A device as claimed in claim 1 wherein the one axis of said units intersect said line perpendicular to said base to form an angle equal to the angles formed at the intersection of each of the other axes and said line.

4. A device as claimed in claim 1 wherein there are at least three of said units.

5. A device as claimed in claim 1 wherein said units are liquid springs having damping means resisting relative movement of said telescoping members.

References Cited in the file of this patent

UNITED STATES PATENTS

| 979,044 | Stadelmann | Dec. 20, 1910 |
| 1,834,450 | Flintermann | Dec. 1, 1931 |
| 2,223,998 | Martin et al. | Dec. 3, 1940 |
| 2,389,304 | Geiger | Nov. 20, 1945 |
| 2,415,026 | Brown | Jan. 28, 1947 |
| 2,594,586 | Ries | Apr. 29, 1952 |
| 2,609,893 | Glassford | Sept. 9, 1952 |

FOREIGN PATENTS

| 103,111 | Australia | Feb. 10, 1938 |
| 345,478 | Germany | Dec. 10, 1921 |
| 565,680 | Germany | Dec. 5, 1932 |